United States Patent
Zbinden et al.

(10) Patent No.: US 9,134,489 B2
(45) Date of Patent: *Sep. 15, 2015

(54) OPTICAL ENGINE FOR ACTIVE OPTICAL CABLE

(75) Inventors: Eric Zbinden, Sunnyvale, CA (US); Marc Epitaux, Sunnyvale, CA (US)

(73) Assignee: Samtec, Inc., New Albany, IN (US)

( * ) Notice: Subject to any disclaimer, the term of this patent is extended or adjusted under 35 U.S.C. 154(b) by 288 days.

This patent is subject to a terminal disclaimer.

(21) Appl. No.: 12/944,545

(22) Filed: Nov. 11, 2010

(65) Prior Publication Data

US 2011/0123150 A1    May 26, 2011

Related U.S. Application Data

(60) Provisional application No. 61/260,192, filed on Nov. 11, 2009.

(51) Int. Cl.
G02B 6/32    (2006.01)
G02B 6/42    (2006.01)

(52) U.S. Cl.
CPC ............ *G02B 6/4214* (2013.01); *G02B 6/4249* (2013.01); *G02B 6/32* (2013.01); *G02B 6/428* (2013.01); *G02B 6/4284* (2013.01)

(58) Field of Classification Search
USPC ............................... 385/49, 52, 88, 89, 92, 93
See application file for complete search history.

(56) References Cited

U.S. PATENT DOCUMENTS

| | | | |
|---|---|---|---|
| 4,699,453 A | 10/1987 | Roberts | |
| 5,175,783 A | 12/1992 | Tatoh | |
| 5,515,468 A | 5/1996 | DeAndrea et al. | |
| 6,203,212 B1 | 3/2001 | Rosenberg et al. | |
| 6,328,484 B1 | 12/2001 | Uebbing | |
| 6,385,374 B2 * | 5/2002 | Kropp | 385/47 |
| 6,454,470 B1 | 9/2002 | Dwarkin et al. | |
| 6,488,417 B2 * | 12/2002 | Kropp | 385/88 |
| 6,668,113 B2 * | 12/2003 | Togami et al. | 385/33 |
| 6,888,988 B2 | 5/2005 | Vancoille et al. | |
| 6,901,185 B2 * | 5/2005 | Sasaki et al. | 385/33 |
| 6,901,221 B1 | 5/2005 | Jiang et al. | |
| 6,921,214 B2 | 7/2005 | Wilson | |
| 6,969,204 B2 | 11/2005 | Kilian | |
| 7,063,467 B2 * | 6/2006 | Nagasaka et al. | 385/88 |
| 7,083,333 B2 | 8/2006 | Hodgson | |
| 7,254,296 B2 | 8/2007 | Lam et al. | |
| 7,298,941 B2 * | 11/2007 | Palen et al. | 385/33 |

(Continued)

OTHER PUBLICATIONS

Zbinden et al.; "Molded Optical Structure for Optical Transceiver";U.S. Appl. No. 12/944,562, filed Nov. 11, 2010.

(Continued)

*Primary Examiner* — Daniel Petkovsek (74) *Attorney, Agent, or Firm* — Keating & Bennett, LLP (57) ABSTRACT

An optical engine is provided for an active optical cable. The optical engine comprises a substrate having electro-optical (EO) components coupled or connected to a same side of the substrate. The optical engine further comprises a molded optical structure (MOS) that couples or connects to the substrate and to optical fibers of the optical cable. The MOS interfaces with the substrate at a position adjacent the EO components. Optical paths through the MOS include a lens system comprising two optical power surfaces or lenses and one reflecting surface. The MOS lens system enables alignment of the optical fibers in a direction orthogonal to the optical axis established by the EO components.

29 Claims, 8 Drawing Sheets

(56) References Cited

U.S. PATENT DOCUMENTS

| | | | |
|---|---|---|---|
| 7,329,054 B1 * | 2/2008 | Epitaux et al. | 385/89 |
| 7,539,367 B2 | 5/2009 | Tamura et al. | |
| 7,543,994 B2 | 6/2009 | McColloch | |
| 7,556,440 B2 * | 7/2009 | Birincioglu et al. | 385/93 |
| 7,630,593 B2 * | 12/2009 | Furuno et al. | 385/14 |
| 8,165,432 B2 | 4/2012 | Ohta et al. | |
| 8,315,492 B2 | 11/2012 | Chen et al. | |
| 8,696,219 B2 | 4/2014 | McColloch | |
| 2001/0000316 A1 * | 4/2001 | Kawai | 385/33 |
| 2008/0226228 A1 * | 9/2008 | Tamura et al. | 385/33 |
| 2011/0123151 A1 * | 5/2011 | Zbinden et al. | 385/33 |
| 2013/0094807 A1 | 4/2013 | Shao et al. | |

OTHER PUBLICATIONS

Connector Supplier, "FCI's new 25Gb/s optical on-board transceiver, just one square inch in size, features 12 transmit and 12 receive channels", Feb. 9, 2015 [retrieved on Feb. 10, 2015], 1 page Retrieved from the Internet: <url: http://www.connectorsupplier.com/fcis-new-25gbs-optical-on-board-transceiver/>.

\* cited by examiner

OPTICAL ENGINE FOR ACTIVE OPTICAL CABLE

RELATED APPLICATION

This application claims the benefit of U.S. Patent Application No. 61/260,192, filed Nov. 11, 2009.

TECHNICAL FIELD

The disclosure herein relates generally to fiber optic communication components and, more specifically, to components for active optical cables.

BACKGROUND

Fiber-optics are steadily replacing copper wire as an appropriate means of communication signal transmission. They span the long distances between local phone systems as well as providing the backbone for many network systems. Other system users include cable television services, university campuses, office buildings, industrial plants, and electric utility companies.

A new market in the fiber optics industry appears to be developing as an alternative to copper or conventional optic links in high-performance computing and data center environments: Active Optical Cables (AOC). As their name implies, the AOCs come with optical transceivers mounted on each end that provide electro-optical (EO) conversion and optical transmission. Users can remove the pluggable copper-based transmission device and plug in the AOC's transceiver/connector, wherein the AOC form factor mirrors that of the copper device it replaces.

To the line card, the active optical cable end looks and functions just like a copper-based transmission device. The fact that the fiber cable comes "hard wired" to the transceiver removes some of the obstacles fiber has encountered in data centers and similar applications. Technicians do not have to worry about eye safety, cleaning, splicing, and other connectorization issues. The AOCs typically include 84% less weight occupying 83% less volume than their copper counterparts. Combined with the natural flexibility of the thinner optical cable, the AOC offers a bend radius 40% less than a 24 AWG copper links. Additionally, the AOCs offer lower latency, indifference to electromagnetic interference, relief from unintended ground loops, price equal to and sometimes better than active copper cables (links that provide amplification and equalization that extend the reach of copper-based transmissions), and a low power interconnect solution because fiber optic is almost lossless compared to a Copper transmission medium with no need for a redriver, buffer chip.

The initial application for active optical cabling is high-performance computing, including cluster computing—applications that have begun to spread from the research and development and scientific communities to high-end enterprise applications for modeling, simulation, and computer-aided design. Passive and active copper cabling provides much of the Infiniband-based server-to-server and server-to-switch connections in such environments. However, as connectivity requirements reach or exceed 10 Gbits/sec and users wish to connect a greater number of more distant computers into clusters, copper's usual bandwidth/distance limitations have become more acute. Industry sources report that passive copper connections begin to sag at around 10 m at 10 Gbits/sec.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

An optical engine is described for an active optical cable. The optical engine comprises a substrate having electro-optical (EO) components coupled or connected to a same side of the substrate. The optical engine further comprises a molded optical structure (MOS) that couples or connects to the substrate and to optical fibers of the optical cable. The MOS interfaces with the substrate at a position adjacent the EO components. Optical paths through the MOS include a lens system comprising two optical power surfaces or lenses and one reflecting surface or lens. The MOS lens system enables alignment of the optical fibers in a direction orthogonal to the optical axis established by the EO components.

The optical engine of an embodiment can be used in numerous types of computer interconnects. As an example, the optical engine can be used in the following example computer interconnects, but is not limited to only these types of computer interconnects: QSFP(+), CX4, CX12, SFP(+), XFP, CXP active optical cables; USB, CIO active optical cables; MDI, DVI, HDMI, Display Port, UDI active optical cables; PCIe x1, x4, x8, x16 active optical cables; SAS, SATA, MiniSATA active optical cables.

In the following description, numerous specific details are introduced to provide a thorough understanding of, and enabling description for, embodiments of the present invention. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Figure 1:
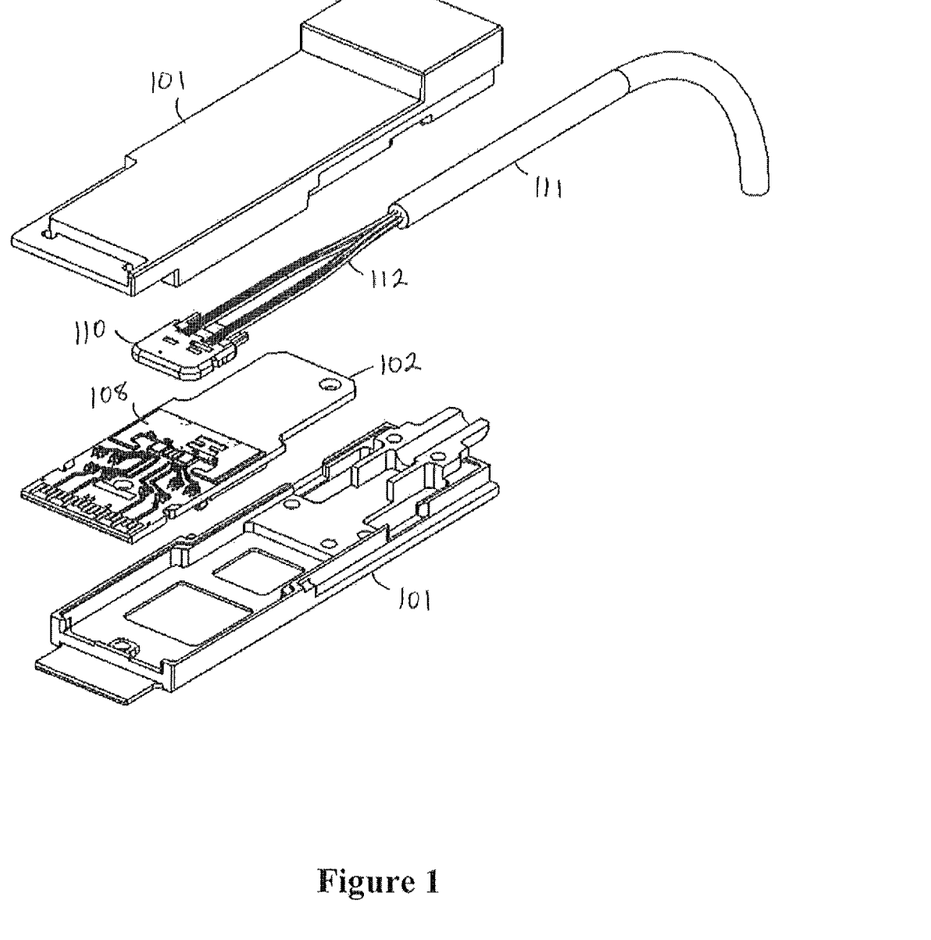
FIG. 1 is an exploded view of the optical engine and active optical cable, under an embodiment.
Figure 2:
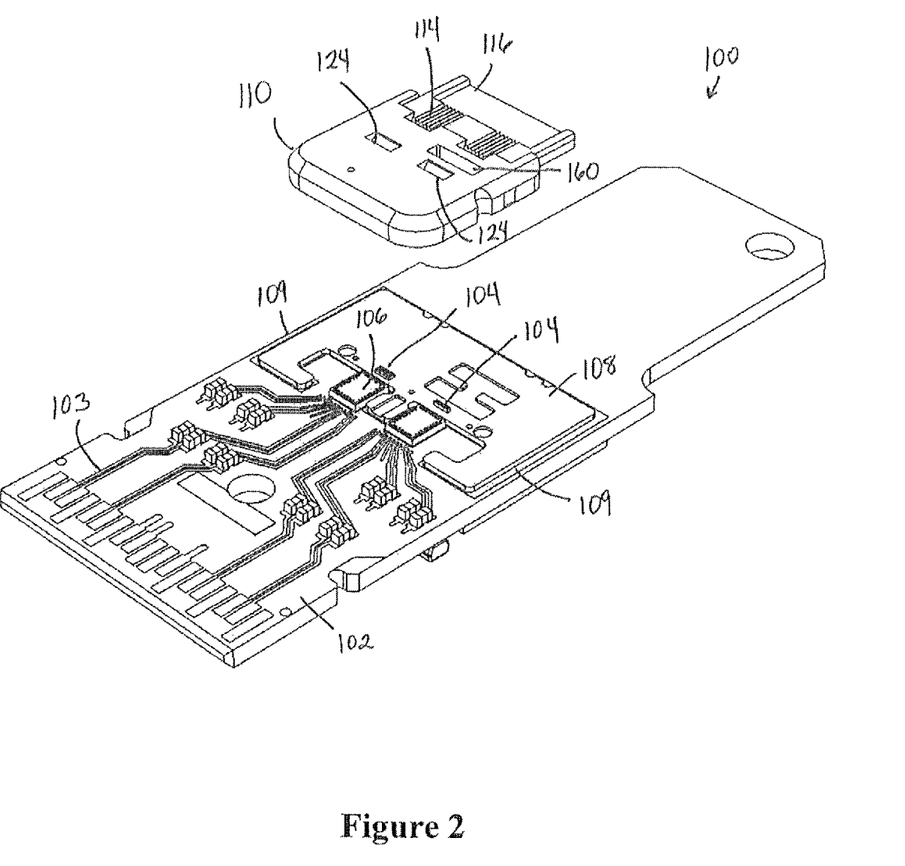
FIG. 2 is a diagram of the optical engine, under an embodiment.
Figure 3:
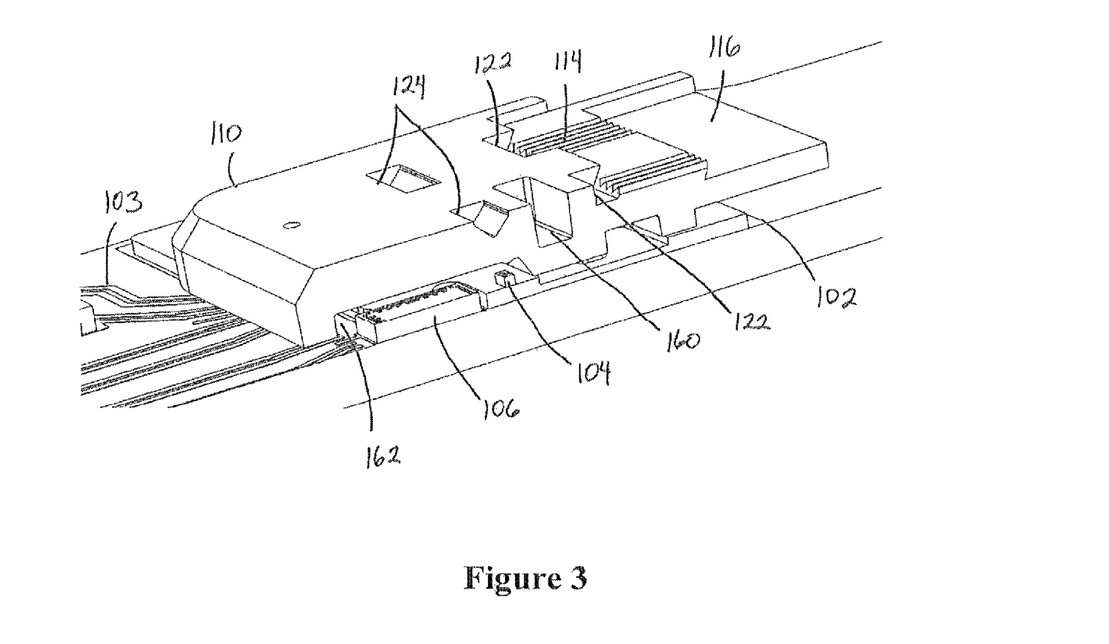
FIG. 3 shows a cross-section of the optical engine, under an embodiment.
Figure 4:
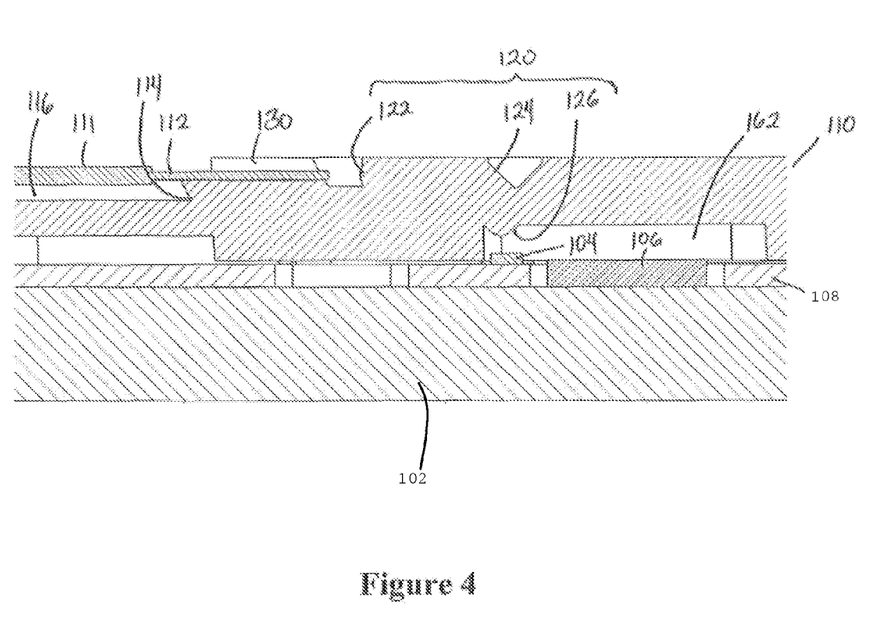
FIG. 4 shows another cross-section of the optical engine, under an embodiment.

FIG. 1 is an exploded view of the optical engine and active optical cable, under an embodiment. FIG. 2 is a diagram of the optical engine, under an embodiment. FIG. 3 shows a cross-section of the optical engine, under an embodiment. FIG. 4 shows another cross-section of the optical engine, under an embodiment. The description below references FIGS. 1-4 collectively.

The optical engine 100 generally comprises a substrate 102, and EO components 104 mounted or connected to one side of the substrate 102. The EO components 104 include, but are not limited to, laser diodes, laser diode arrays, and/or photodetectors. The optical engine 100 comprises a molded optical structure (MOS) 110 that couples or connects to the substrate 102 and to optical fibers 112. The MOS 110 of an embodiment interfaces with the substrate 102 at a position adjacent the EO components 104. The MOS 110 includes a lens system 120 that functions to focus and direct light from the optical fibers 112 onto the EO components 104 and to focus and direct light from the EO components 104 into the optical fibers 112.

The MOS 110 includes a fiber alignment structure 114 that secures the optical fibers 112 to the MOS 110. In addition to the lens system 120, the MOS 100 includes numerous optical paths through the MOS 100. Each optical path comprises a first lens 122 positioned at a first end of the optical path and a second lens 126 positioned at a second end of the optical path. The first lens 122 is adjacent the optical fibers 112, but is not so limited. Each optical path further includes a reflector 124 or reflector lens positioned between the first lens 122 and the second lens 126. The reflector 124, which is positioned in the optical path, functions to reflect light in a direction approximately normal to a direction from which the light is received.

As an example, the optical engine 100 for the active optical cable resides in a housing 101 with an electrical interface and an optical cable 111. The optical engine 100 is mounted on an organic (e.g., FR4) or ceramic (e.g., Alumina) substrate 102 on which electrical traces 103 are used to route data signals. The optical engine 100 comprises EO components 104 including electro-optical (EO) converters, semiconductor chips (e.g., analog chips) 106 that drive the electro-optical (EO) converters, and a single MOS 110 that is a multi-port lens system. The components of the optical engine 100 are surface-mounted one the same side of the substrate 102 using standard semiconductor assembly processes.

The EO converters include a laser diode singlet or array, and a photodetector singlet or array. The laser diode functions to convert an electrical current into light; an example of a laser diode of an embodiment is a vertical-cavity surface-emitting laser (VCSEL), but the embodiment is not so limited. The photodetector functions to convert received light into current. The semiconductor chips 106 electrically drive the EO converters and include, for example, a laser diode driver for the laser, and a trans-impedance amplifier (TIA) for the photodetector.

The optical engine 100 of an embodiment comprises a riser 108 coupled or connected to the substrate 102. The riser 108, which can be formed from metallic or ceramic compositions, for example, is attached to the substrate 102 and serves as a planar mechanical reference for receiving and aligning the EO components 104 and the MOS 110. The riser 108 is also used to conduct heat generated by the EO components 104 and/or the semiconductor chips 106 to one or more side or edge regions 109 of the optical engine 100. Further, the active optical cable housing 111 is placed in thermal contact with the riser extension 108 to pump any heat out of the riser 108.

Figure 5:
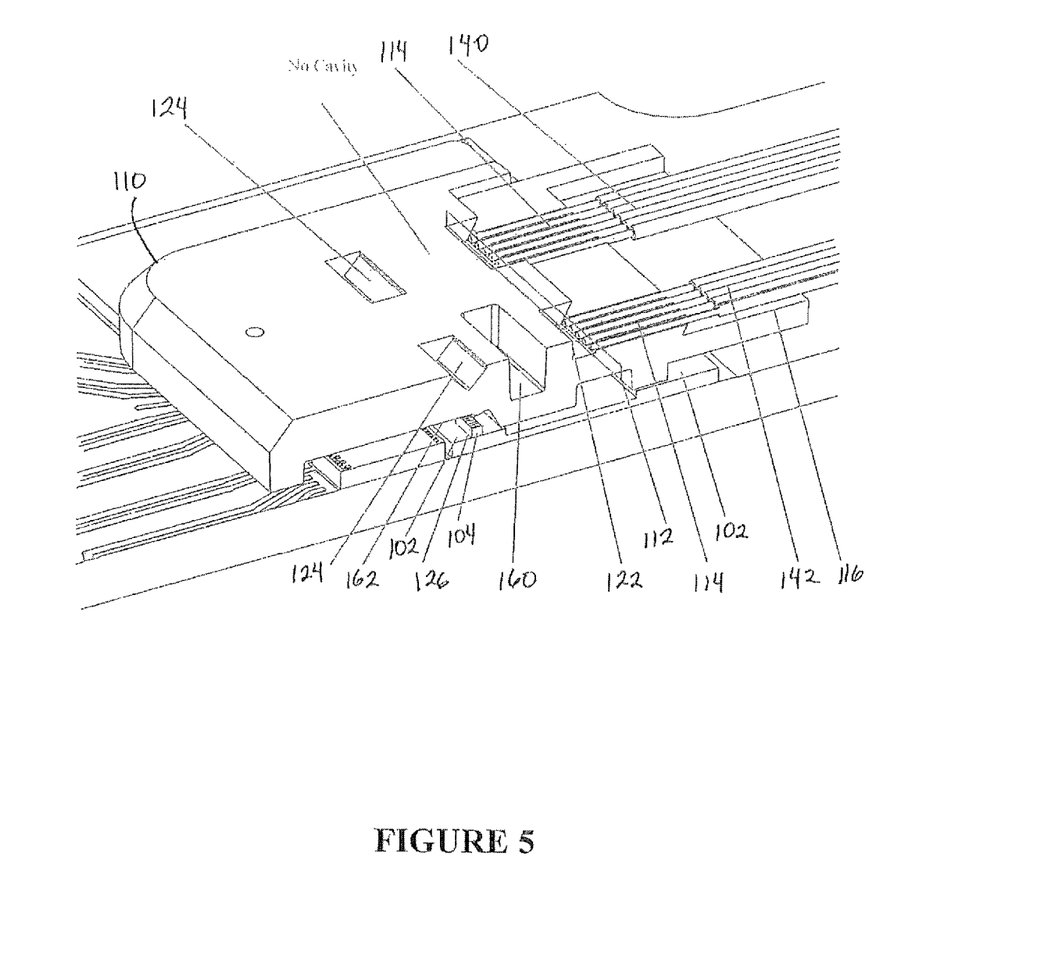
FIG. 5 shows a cross-section of the MOS, under an embodiment.
Figure 6:
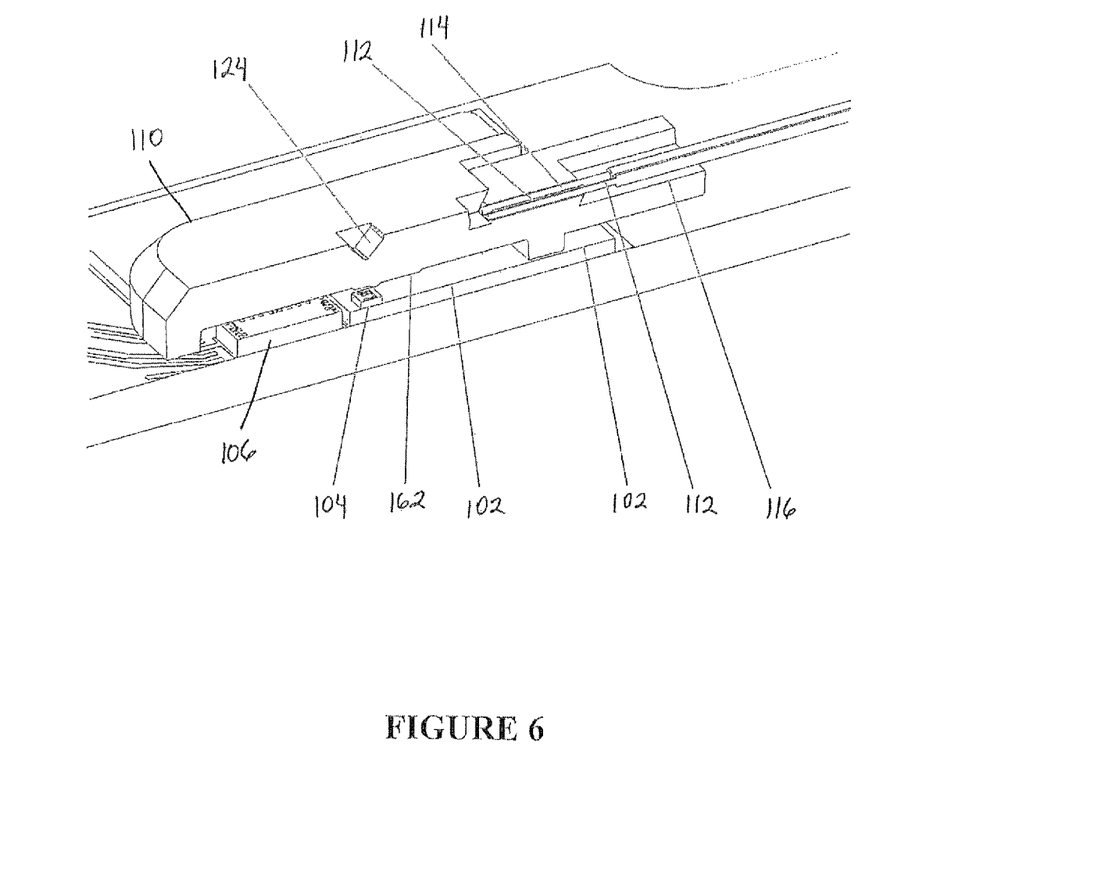
FIG. 6 shows another cross-section of the MOS, under an embodiment.
Figure 7:
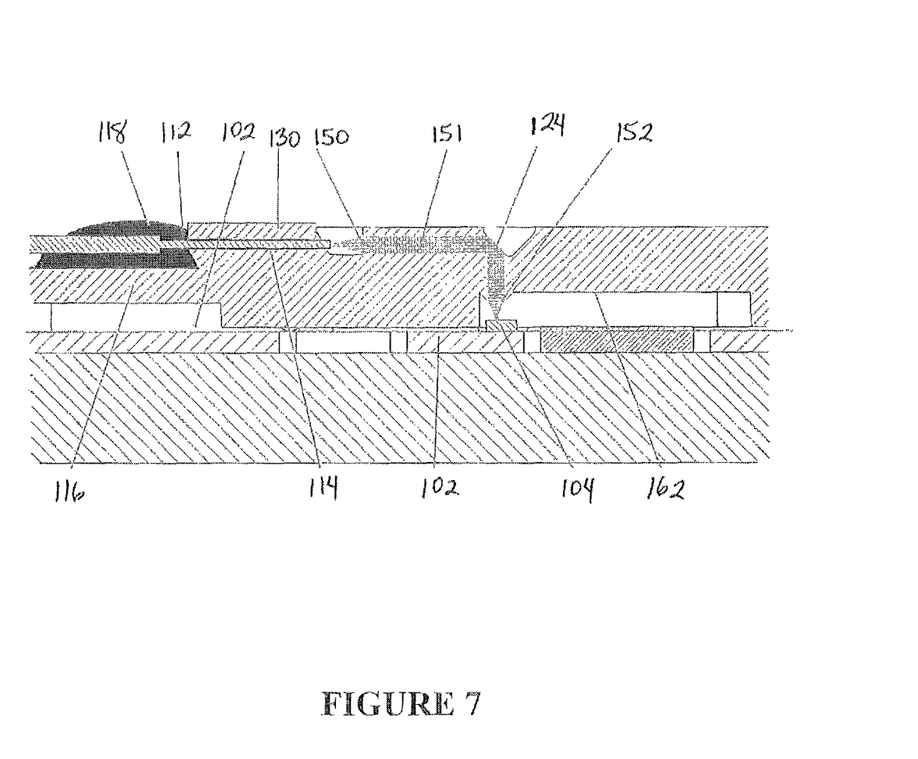
FIG. 7 shows yet another cross-section of the MOS, under an embodiment.

FIG. 5 shows a cross-section of the MOS 110, under an embodiment. FIG. 6 shows another cross-section of the MOS 110, under an embodiment. FIG. 7 shows yet another cross-section of the MOS 110, under an embodiment. The description below references FIGS. 5-7 collectively.

The MOS 110 is a single injection molded optical component, but is not so limited. The MOS 110 includes a multi-port lens system 120 that launches light emitted by the laser into the optical fibers 112 and directs light emitted from the optical fibers 112 to the photodetector. The MOS 110, as described above, connects to an optical cable, and uses a fiber alignment structure 114 to secure optical fibers 112 of the optical cable to the MOS 110. The fiber alignment structure 114 is a first planar surface that includes numerous grooves. The grooves include V-shaped grooves, but are not so limited. Each groove receives and aligns an optical fiber 112 in the MOS 110. A pressure plate 130 secures the optical fibers 112 in the grooves. The MOS 110 further includes a section 116 extending beyond the grooves that functions to relieve strain on the optical fibers 112. Epoxy 118 is used to secure the optical fibers to the strain relief section of the MOS 110. The MOS 110 including the grooved fiber alignment structure enables assembly techniques wherein the optical fibers 112 are held in a clamp and stripped, cleaved, passively aligned, and permanently attached to the MOS 110 in a single operation.

The MOS fiber alignment structure 114 of an embodiment receives multiple sets 140/142 of optical fibers. In this embodiment, the grooves of the fiber alignment structure 114 include sets of grooves, and each set of grooves receives a set of optical fibers 140/142. The optical fiber sets 140/142 are separated by a distance 144 in order to minimize cross-talk between optical fiber sets 140/142 and to allow for component placement on the substrate 102.

The EO components 104 of an embodiment, when connected to the planar substrate 102, emit light in and receive light from a direction that is approximately normal to the plane 102 to which they are connected. Consequently, the MOS 110 includes optical paths 150 through the MOS that include two optical power surfaces or lenses 122 and 126 and one reflecting surface 124 that enable alignment of the optical fibers 112 in a direction orthogonal to the optical axis (established by EO component placement).

Each optical path 150 comprises a first section 151 and a second section 152. The first section 151 of each optical path 150 is bounded by a first lens 122 positioned at a first end of the first section 151 and a reflector or reflector lens 124 positioned at a second end of the first section 151. The first lens 122 is adjacent the optical fibers 112, but is not so limited. The second section 152 of each optical path 150 is bounded by the reflector 124 at a first end of the second section 152 and a second lens 126 positioned at a second end of the second section 152. The reflector 124, which is positioned in the optical path 150, functions to reflect light in a direction approximately normal to a direction from which the light is received.

Figure 8:
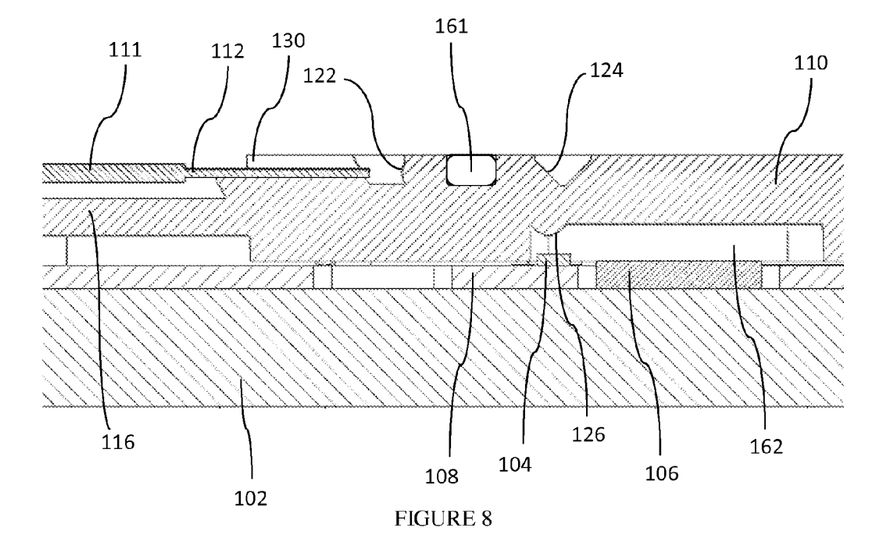
FIG. 8 shows a cross-section of the MOS with an optical attenuator.

One or more optical paths of the MOS can include an open cavity 160. The open cavity 160 enables placement of an optical attenuator 161 as shown in FIG. 8. The optical attenuator, when used, is secured in the open cavity 160 by epoxy, and this minimizes or eliminates Fresnel reflection.

The MOS 110 of an embodiment includes a component cavity 162 that creates an enclosed space between the planar surface of the substrate 102 and the MOS 110. The component cavity 162 provides protection to EO components 104 mounted on the region of the substrate surface 102 bounded or enclosed by the component cavity 162.

In operation, the optical engine can be used as an optical transmitter, an optical receiver, or as an optical transceiver including transmitter and receiver components. Using the optical transceiver as an example, the optical engine includes transmitter/emitter components and receiver components. An embodiment includes a separation or distance between transmitter and receiver components in order to minimize or eliminate cross-talk between the transmitter and receiver.

Operation of the transmitter/emitter components includes the generation of light using the laser diode singlet or array. Each light beam hits an optical surface of the lens system, which collimates the light. The lens system turns the beam by approximately 90 degrees using the TIR surface, as described above, and then focuses/launches the beam into multimode fibers.

Operation of the receiver components includes emission of light from the optical fibers. Each emitted light beam hits an optical surface of the lens system, which collimates the light. The lens system turns the beam by approximately 90 degrees using the TIR surface, and then focuses/launches the beam onto the photodetector.

The optical engine is formed using single-side surface-mount component assembly along with a two-step alignment process. Forming of the optical engine of an embodiment comprises bonding the laser diode singlet or array on the substrate relatively to fiducial marks by a precise diebonder. The photodetector singlet or array is aligned and bonded precisely relatively to the laser diode singlet or array. The MOS is aligned and bonded precisely relatively to the laser diode and photodetector singlets or arrays. The MOS includes V-grooves to accommodate a precise placement of the fibers, and the fibers are passively placed in the multi-port lens V-grooves and attached to the lens. In this manner, the fibers are directly attached and aligned to the lens.

On the transmit side of the optical engine, the electrical signal coming from the active optical cable electrical interface is routed and wirebonded from the substrate to the laser diode driver. The laser diode driver is wirebonded to the laser diodes.

On the receiver side of the optical engine, the electrical signal coming from the photodetector is connected to the TIA through wirebonds. The TIA is wirebonded to the substrate which route the signal to the active optical cable electrical interface.

Embodiments described herein include a device comprising a substrate. The device comprises a plurality of electro-optical (EO) components connected to a side of the substrate. The device comprises a molded optical structure (MOS) including a lens system. The MOS is connected to the side and positioned adjacent the EO components. The lens system focuses light from the EO components into a plurality of optical fibers, and focuses light from the plurality of optical fibers onto the EO components.

Embodiments described herein include a device comprising: a substrate; a plurality of electro-optical (EO) components connected to a side of the substrate; and a molded optical structure (MOS) including a lens system, the MOS connected to the side and positioned adjacent the EO components, wherein the lens system focuses light from the EO components into a plurality of optical fibers, and focuses light from the plurality of optical fibers onto the EO components.

The device of an embodiment comprises a plurality of optical paths through the MOS, each optical path comprising a first section and a second section, wherein the first section is adjacent the plurality of optical fibers.

The lens system of an embodiment comprises a first lens positioned at a first end of the first section, a second lens positioned at a second end of the second section, and a reflector positioned in the optical path, the reflector reflecting light in a direction approximately orthogonal to a direction from which the light is received.

The reflector of an embodiment comprises a total internal reflection (TIR) surface.

The MOS of an embodiment comprises a cavity positioned in the first section of the optical path, and an attenuator positioned in the cavity.

The MOS of an embodiment creates an enclosure over the EO components.

The second lens of an embodiment is an optical interface to the EO components.

The device of an embodiment comprises a riser connected to the substrate.

The riser of an embodiment comprises an alignment reference for the MOS and the EO components.

The riser of an embodiment comprises a heat sink.

The riser of an embodiment comprises at least one of metal and ceramic.

The EO components of an embodiment comprise a laser diode and a photodetector.

The MOS of an embodiment comprises a fiber alignment structure.

The fiber alignment structure of an embodiment is a first planar surface, wherein the fiber alignment structure comprises a plurality of grooves that receive and align the plurality of optical fibers.

The device of an embodiment comprises a pressure plate that secures the plurality of optical fibers in the plurality of grooves.

Embodiments described herein include a device comprising a substrate. The device includes a plurality of electro-optical (EO) components connected to a side of the substrate. The device includes a molded optical structure (MOS) connected to the side and to a plurality of optical fibers. The MOS comprises a plurality of optical paths through the MOS, the plurality of optical paths positioned to interface with the plurality of optical fibers and the EO components. The MOS comprises a first lens, a second lens, and a reflector positioned in an optical path between the first lens and the second lens. The reflector reflects light in a direction approximately normal to a direction from which the light is received.

Embodiments described herein include a device comprising: a substrate; a plurality of electro-optical (EO) components connected to a side of the substrate; and a molded optical structure (MOS) connected to the side and to a plurality of optical fibers, the MOS comprising a plurality of optical paths through the MOS, the plurality of optical paths positioned to interface with the plurality of optical fibers and the EO components, the MOS comprising a first lens, a second lens, and a reflector positioned in an optical path between the first lens and the second lens, the reflector reflecting light in a direction approximately normal to a direction from which the light is received.

Each optical path of an embodiment comprises a first section and a second section, wherein the first section is adjacent the plurality of optical fibers.

The first lens of an embodiment is positioned at a first end of the first section, and the second lens is positioned at a second end of the second section.

The reflector of an embodiment comprises a total internal reflection (TIR) surface, wherein the TIR surface redirects light received from at least one of the first lens and the second lens.

The MOS of an embodiment comprises a first cavity positioned in at least one optical path.

The device of an embodiment comprises an attenuator positioned in the first cavity.

The device of an embodiment comprises a second cavity in the MOS, the second cavity housing the second lens.

The second lens of an embodiment is an optical interface to the EO components.

The device of an embodiment comprises a riser connected to the substrate.

The riser of an embodiment comprises a heat sink.

The MOS of an embodiment comprises a fiber alignment structure that receives and aligns the plurality of optical fibers.

Embodiments described herein include an active optical cable comprising a housing coupled to an optical cable and housing a substrate. The active optical cable of an embodiment includes a plurality of optical fibers connected to a side of the substrate and housed in the optical cable. The active optical cable of an embodiment includes a lens system connected to the side and positioned adjacent the optical fibers. The active optical cable of an embodiment includes a laser diode and a photodetector connected to the side and positioned adjacent the lens system, wherein the lens system focuses light output of the laser diode into the plurality of optical fibers, and focuses light output of the plurality of optical fibers onto the photodetector.

Embodiments described herein include an active optical cable comprising: a housing coupled to an optical cable and housing a substrate; a plurality of optical fibers connected to a side of the substrate and housed in the optical cable; a lens system connected to the side and positioned adjacent the optical fibers; and a laser diode and a photodetector connected to the side and positioned adjacent the lens system, wherein the lens system focuses light output of the laser diode into the plurality of optical fibers, and focuses light output of the plurality of optical fibers onto the photodetector.

The active optical cable of an embodiment comprises a plurality of optical paths through the housing, each optical path comprising a first section and a second section, wherein the first section is adjacent the plurality of optical fibers and the second section is adjacent at least one of the laser diode and the photodetector.

The lens system of an embodiment comprises a first lens positioned at a first end of the first section, and a second lens positioned at a second end of the second section.

The lens system of an embodiment comprises a reflector positioned in the optical path, the reflector reflecting light in a direction approximately normal to a direction from which the light is received.

The reflector of an embodiment comprises a total internal reflection (TIR) surface.

The active optical cable of an embodiment comprises a riser connected to the side of the substrate.

The riser of an embodiment comprises an alignment reference for at least one of the lens system, the laser diode, and the photodetector.

The riser of an embodiment comprises a heat sink.

Embodiments described herein include a device comprising a molded optical structure (MOS) connected to optical fibers. The device of an embodiment includes a plurality of optical paths through the MOS. Each optical path of an embodiment comprises a first section and a second section. The first section of an embodiment is adjacent the optical fibers. The device of an embodiment includes a first lens positioned at a first end of the first section. The device of an embodiment includes a second lens positioned at a second end of the second section. The device of an embodiment includes a reflector positioned in the optical path. The reflector of an embodiment reflects light in a direction approximately normal to a direction from which the light is received.

Embodiments described herein include a device comprising a molded optical structure (MOS) connected to optical fibers. The device of an embodiment includes a plurality of optical paths through the MOS, each optical path comprising a first section and a second section, wherein the first section is adjacent the optical fibers; a first lens positioned at a first end of the first section; a second lens positioned at a second end of the second section; and a reflector positioned in the optical path, the reflector reflecting light in a direction approximately normal to a direction from which the light is received.

The device of an embodiment comprises a fiber alignment structure that is a first planar surface, wherein the fiber alignment structure comprises a plurality of grooves, wherein each groove of the plurality of grooves receives and aligns an optical fiber.

The device of an embodiment comprises a pressure plate that secures the optical fibers in the plurality of grooves.

The plurality of grooves of an embodiment includes a plurality of groove sets, wherein the plurality of groove sets is separated by a distance, wherein the optical fibers comprise a plurality of optical fiber sets.

The reflector of an embodiment comprises a total internal reflection (TIR) surface, wherein the TIR surface redirects light received from at least one of the first lens and the second lens.

The device of an embodiment comprises a first cavity in the MOS, the first cavity positioned in the first section of at least one optical path.

The device of an embodiment comprises an attenuator positioned in the first cavity.

The device of an embodiment comprises a second cavity in the MOS, the second cavity housing the second lens.

When the MOS of an embodiment is mated to a structure comprising electro-optical (EO) components mounted on a second planar surface, the second cavity creates an enclosure over the second planar surface that houses the EO components.

The second lens of an embodiment is an optical interface to the EO components mounted on the second planar surface, wherein the EO components comprise at least one of a laser diode, a laser diode array, and a photodetector.

Embodiments described herein include a device comprising a molded optical structure (MOS) including a fiber alignment structure. The device of an embodiment includes a plurality of optical fibers secured to the fiber alignment structure. The device of an embodiment includes a plurality of optical paths through the MOS. Each optical path of an embodiment comprises a first section and a second section. The first section of an embodiment is bounded by a first lens and a reflective surface. The second section of an embodiment is bounded by the reflective surface and a second lens. The first lens of each optical path of an embodiment is adjacent to and corresponds to an optical fiber of the plurality of optical fibers. The first section and the second section of each optical path of an embodiment lie in different planes.

Embodiments described herein include a device comprising: a molded optical structure (MOS) including a fiber alignment structure; a plurality of optical fibers secured to the fiber alignment structure; a plurality of optical paths through the MOS, each optical path comprising a first section and a second section, the first section bounded by a first lens and a reflective surface, the second section bounded by the reflective surface and a second lens; wherein the first lens of each optical path is adjacent to and corresponds to an optical fiber of the plurality of optical fibers; and wherein the first section and the second section of each optical path lie in different planes.

The first section of an embodiment lies in a first plane and the second section lies in a second plane, the second plane approximately orthogonal to the first plane.

The fiber alignment structure of an embodiment is a first planar surface, wherein the fiber alignment structure comprises a plurality of grooves, wherein each groove of the plurality of grooves receives and aligns an optical fiber of the plurality of optical fibers.

The device of an embodiment comprises a pressure plate that secures the plurality of optical fibers in the plurality of grooves.

The plurality of grooves of an embodiment includes a plurality of groove sets, wherein the plurality of groove sets is separated by a distance, wherein the plurality of optical fibers comprises a plurality of optical fiber sets.

The plurality of groove sets of an embodiment comprises two groove sets and the plurality of optical fiber sets comprises two optical fiber sets, wherein a first groove set receives a first optical fiber set and a second groove set receives a second optical fiber set.

The reflective surface of an embodiment comprises a total internal reflection (TIR) surface, wherein the TIR surface turns the light directed at the TIR surface from at least one of the first lens and the second lens, wherein the TIR reflects light in a direction approximately normal to a direction from which the light is received.

The device of an embodiment comprises a first cavity in the MOS, the first cavity positioned in the first section of at least one optical path.

The device of an embodiment comprises an attenuator positioned in the first cavity.

The device of an embodiment comprises a second cavity in the MOS, the second cavity housing the second lens.

When the MOS of an embodiment is mated to a structure comprising electro-optical (EO) components mounted on a second planar surface, the second cavity of an embodiment creates an enclosure over the second planar surface that houses the EO components.

The second lens of an embodiment is an optical interface to the EO components mounted on the second planar surface.

The EO components of an embodiment focus light into the optical fibers via the optical paths by emitting light in a direction approximately normal to the second planar surface.

The EO components of an embodiment receive light from the optical fibers via the optical paths by receiving light from a direction approximately normal to the second planar surface.

The EO components of an embodiment comprise a photodetector and at least one of a laser diode and a laser diode array.

Networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof. Storage resources accessed by the system comprise storage networks (e.g., SAN, NAS, etc.), direct attached disks (e.g., DAS), and can also include removable media (e.g., CD, DVD, Tape, Flash, etc).

The embodiments described herein can be a component of a single system, multiple systems, and/or geographically separate systems. The embodiments described herein can also be a subcomponent or subsystem of a single system, multiple systems, and/or geographically separate systems. The embodiments described herein can be coupled to one or more other components (not shown) of a host system or a system coupled to the host system.

One or more components of the embodiments described herein and/or a corresponding system or application to which the embodiments described herein are coupled or connected include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes the embodiments described herein can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the embodiments described herein and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the embodiments described herein and corresponding systems and methods include: microcontrollers with memory (such as electronically erasable programmable read only memory (EEPROM)), embedded microprocessors, firmware, software, etc. Furthermore, aspects of the embodiments described herein and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments and corresponding systems and methods is not intended to be exhaustive or to limit the systems and methods to the precise forms disclosed. While specific embodiments and examples are described herein for illustrative purposes, various equivalent modifications are possible within the scope of the systems and methods, as those skilled in the relevant art will recognize. The teachings provided herein can be applied to other systems and methods, not only for the systems and methods described above.

The elements and acts of the various embodiments described above can be combined to provide further embodiments. These and other changes can be made to the embodiments described herein and corresponding systems and methods in light of the above detailed description.

In general, in the following claims, the terms used should not be construed to limit the embodiments and corresponding systems and methods to the specific embodiments disclosed in the specification and the claims, but should be construed to include all systems that operate under the claims. Accordingly, the embodiments and corresponding systems and methods are not limited by the disclosure, but instead the scope is to be determined entirely by the claims.

While certain aspects of the embodiments and corresponding systems and methods are presented below in certain claim forms, the inventors contemplate the various aspects of the embodiments and corresponding systems and methods in any number of claim forms. Accordingly, the inventors reserve the right to add additional claims after filing the application to pursue such additional claim forms for other aspects of the embodiments and corresponding systems and methods.

What is claimed is:

1. A device comprising:
a substrate comprising a first side and a second side;
a plurality of electro-optical (EO) components connected to the first side; and
a molded optical structure (MOS) connected to the first side and including a lens system and a first cavity; and
an attenuator located in the first cavity; wherein
the lens system focuses light from the EO components into a plurality of optical fibers and focuses light from the plurality of optical fibers onto the EO components and includes:
a first lens;
a second lens; and
a reflector; and
the lens system defines a plurality of optical paths;
each optical path of the plurality of optical paths is a single optical path that is separate from other optical paths of the plurality of optical paths; and
the attenuator is positioned in at least one of the plurality of optical paths but not all of the plurality of optical paths.

2. The device of claim 1, wherein:
each optical path of the plurality of optical paths comprises a first section and a second section; and
the first section is adjacent to the plurality of optical fibers.

3. The device of claim 2, wherein:
the first lens is positioned in the first section;
the second lens is positioned in the second section; and
the reflector is positioned to reflect light in a direction orthogonal or approximately orthogonal to a direction from which the light is received.

4. The device of claim 3, wherein the reflector comprises a total internal reflection (TIR) surface.

5. The device of claim 3, wherein the MOS creates an enclosure over the EO components.

6. The device of claim 5, wherein the second lens is an optical interface to the EO components.

7. The device of claim 1, wherein the EO components comprise a laser diode and a photodetector.

8. The device of claim 1, wherein the MOS comprises a fiber alignment structure.

9. The device of claim 8, wherein the fiber alignment structure is a first planar surface, wherein the fiber alignment structure comprises a plurality of grooves that receive and align the plurality of optical fibers.

10. The device of claim 9, comprising a pressure plate that secures the plurality of optical fibers in the plurality of grooves.

11. The device of claim 1, wherein the attenuator is secured in the first cavity with an epoxy that reduces Fresnel reflections.

12. The device of claim 1, wherein the device is configured to be used in a computer interconnect with a format selected from QSFP(+), CX4, CX12, SFP(+), XFP, CXP, USB, CIO, MDI, DVI, HDMI, Display Port, UDI, PCIe x1, x4, x8, x16, SAS, SATA, and MiniSATA.

13. The device of claim 1, wherein the device is configured to be used in a transceiver or an active optical cable.

14. The device of claim 1, further comprising a riser connected to the first side.

15. The device of claim 14, wherein the riser comprises an alignment reference for the MOS and the EO components.

16. The device of claim 14, wherein the riser comprises a heat sink.

17. The device of claim 14, wherein the riser comprises at least one of metal and ceramic.

18. A device comprising:
a substrate comprising a first side and a second side;
a plurality of electro-optical (EO) components connected to the first side; and
a molded optical structure (MOS) connected to the first side and to a plurality of optical fibers and including:
   a first cavity;
   a plurality of optical paths between the plurality of optical fibers and the EO components, each of the plurality of optical paths includes:
      a first lens;
      a second lens; and
      a reflector positioned to reflect light in a direction normal or approximately normal to a direction from which the light is received; wherein
   the first lens, the second lens, and the reflector define a single one of the plurality of optical paths that is separate from other optical paths of the plurality of optical paths; and
an attenuator located within the first cavity and positioned between the first and second lenses in at least one of the plurality of optical paths but not all of the plurality of optical paths.

19. The device of claim 18, wherein each of the plurality of optical paths comprises a first section and a second section, wherein the first section is adjacent to the plurality of optical fibers.

20. The device of claim 19, wherein the first lens is positioned at a first end of the first section, and the second lens is positioned at a second end of the second section.

21. The device of claim 20, wherein the reflector comprises a total internal reflection (TIR) surface, wherein the TIR surface redirects light received from at least one of the first lens and the second lens.

22. The device of claim 18, comprising a second cavity in the MOS, the second cavity housing the second lens.

23. The device of claim 22, wherein the second lens is an optical interface to the EO components.

24. The device of claim 18, wherein the MOS comprises a fiber alignment structure that receives and aligns the plurality of optical fibers.

25. The device of claim 18, wherein the attenuator is secured in the first cavity with an epoxy that reduces Fresnel reflections.

26. The device of claim 18, wherein the device is used in a computer interconnect with a format selected from QSFP(+), CX4, CX12, SFP(+), XFP, CXP, USB, CIO, MDI, DVI, HDMI, Display Port, UDI, PCIe x1, x4, x8, x16, SAS, SATA, and MiniSATA.

27. The device of claim 18, wherein the device is configured to be used in a transceiver or an active optical cable.

28. The device of claim 18, further comprising a riser connected to the first side.

29. The device of claim 28, wherein the riser comprises a heat sink.

* * * * *